United States Patent

[11] 3,553,418

[72] Inventors Oscar W. Garver
Indianapolis, Ind.;
Frederick E. Ullman, Winnetka; Christian H. Stettler, Northbrook, Ill.; Hans W. Kopp, Saint Gall, Switzerland
[21] Appl. No. 681,405
[22] Filed Nov. 8, 1967
Division of Ser. No. 463,062, Apr. 29, 1965, Patent No. 3,490,904, which is in a division of Ser. No. 180,415, Mar. 15, 1962, Patent No. 3,233,072.
[45] Patented Jan. 5, 1971
[73] Assignee Grotnes Machine Works, Inc.
Chicago, Ill.
a corporation of Illinois

[54] WELDING MACHINE AND PROCEDURE FOR WELDING ATTACHMENTS TO BASE MEMBERS AND HAVING PROVISION FOR CHECKING FOR THE PRESENCE OF A WELDED ATTACHMENT AND THE ADEQUACY OF THE WELD
5 Claims, 28 Drawing Figs.

[52] U.S. Cl..................................................... 219/79,
200/61.42, 219/78, 219/80, 219/103
[51] Int. Cl..................................................... 323k 11/10,
H01h 3/16
[50] Field of Search........................................ 219/78, 79,
103, 109; 200/61.42

[56] References Cited
UNITED STATES PATENTS
| | | | |
|---|---|---|---|
| 3,123,703 | 3/1964 | Loeper............................ | 219/79X |
| 2,316,597 | 4/1943 | Kershaw........................ | 219/103 |
| 2,338,002 | 12/1943 | Mero............................... | 219/79 |
| 2,671,139 | 3/1954 | Dilts............................... | 200/61.42 |
| 2,771,539 | 11/1956 | Myers............................. | 219/79 |

Primary Examiner—J. V. Truhe
Assistant Examiner—L. A. Schutzman
Attorney—Wolfe, Hubbard, Leydig, Voit & Osann ABSTRACT: A welding machine and procedure for welding attachments to base members wherein provision is made for checking the products discharged from the welding station both for the presence of a welded attachment and the adequacy of the weld, and for signalling the detection of a defective condition.

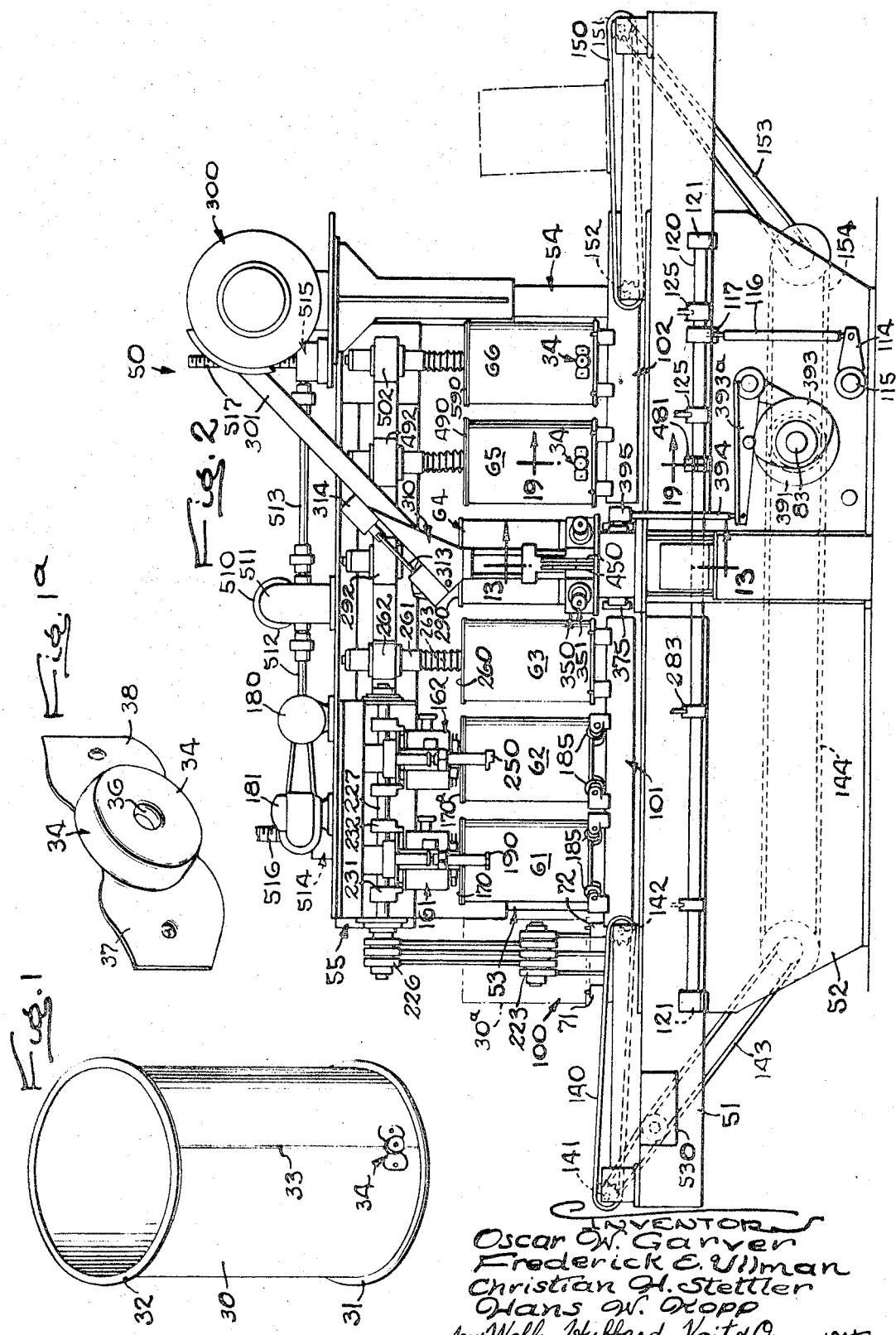

INVENTORS
Oscar W. Garver
Frederick E. Ullman
Christian H. Stettler
Hans W. Kopp
by: Wolfe, Hubbard, Voit & Osann
ATTORNEY

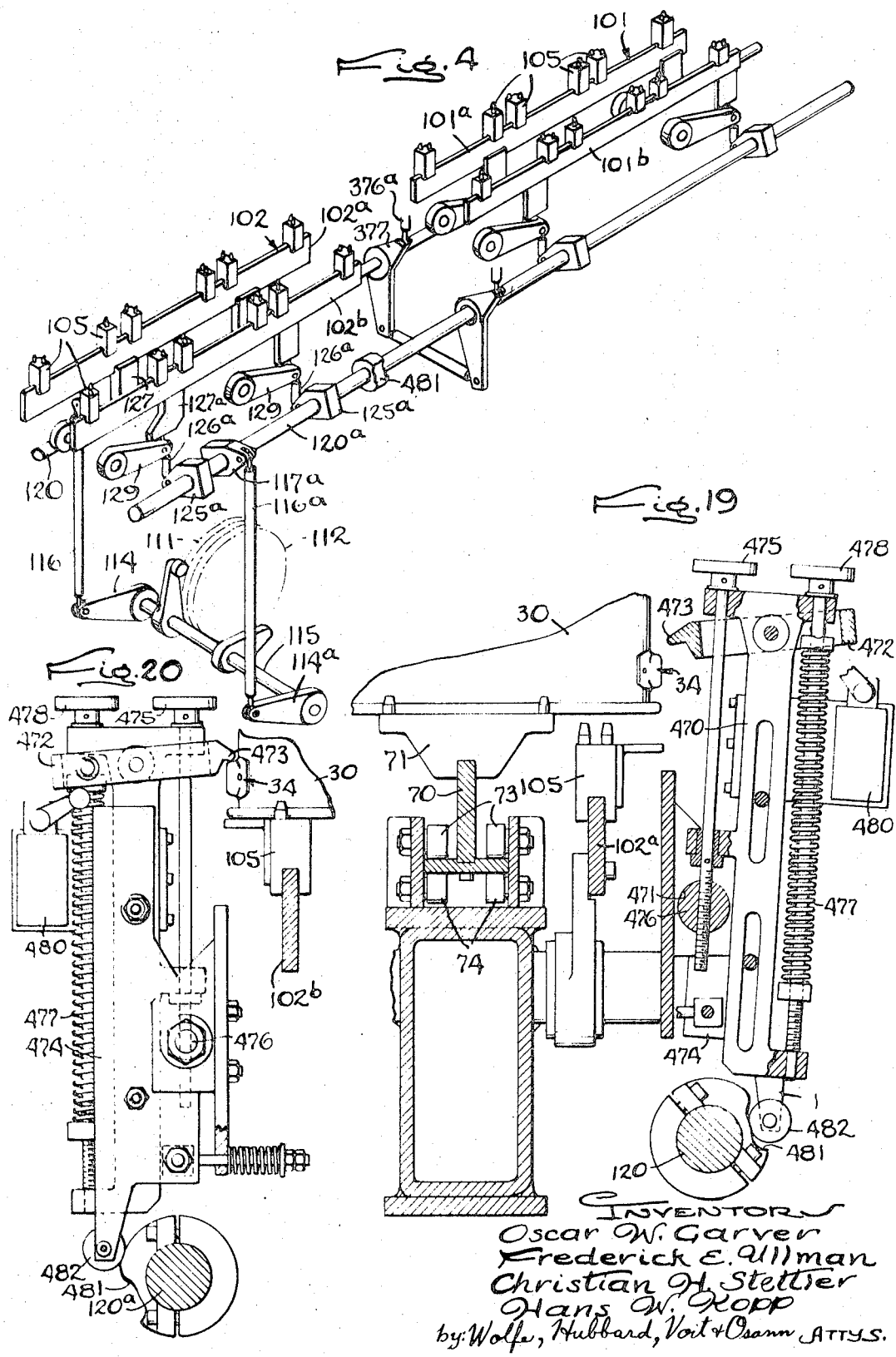

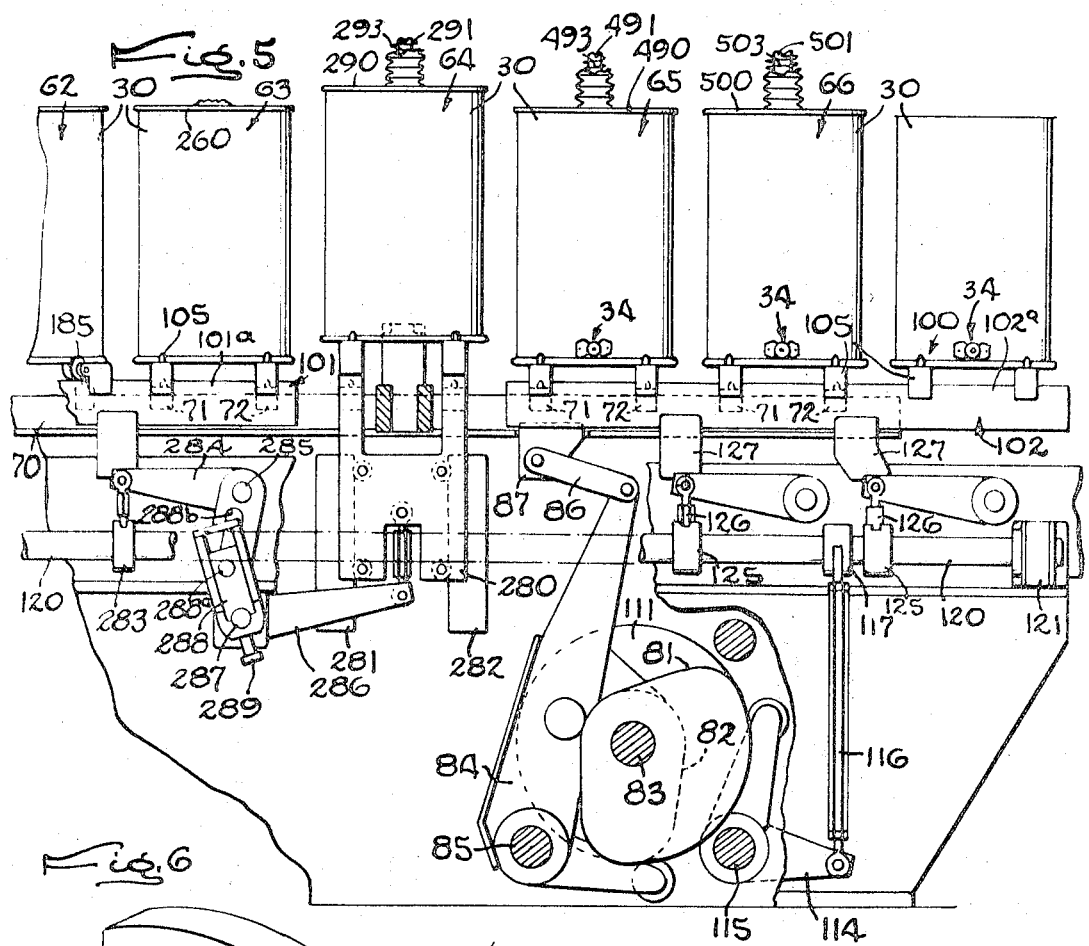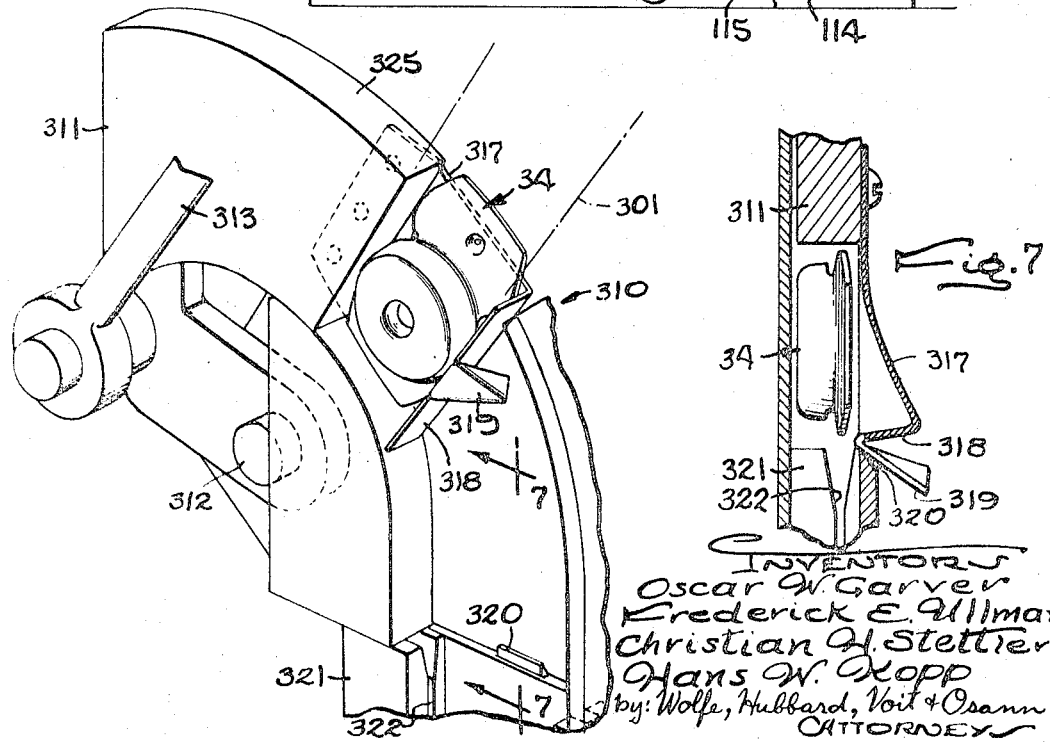

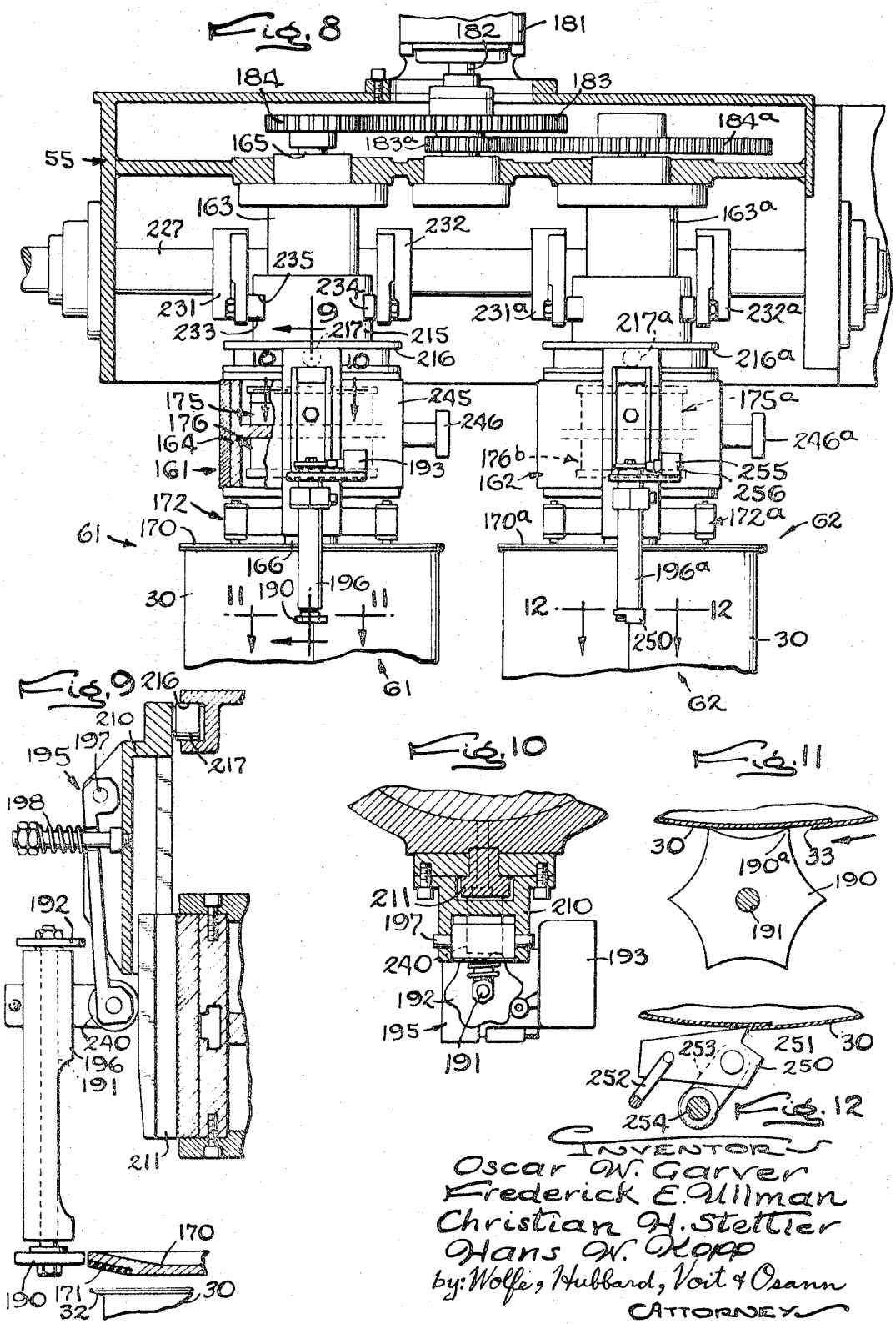

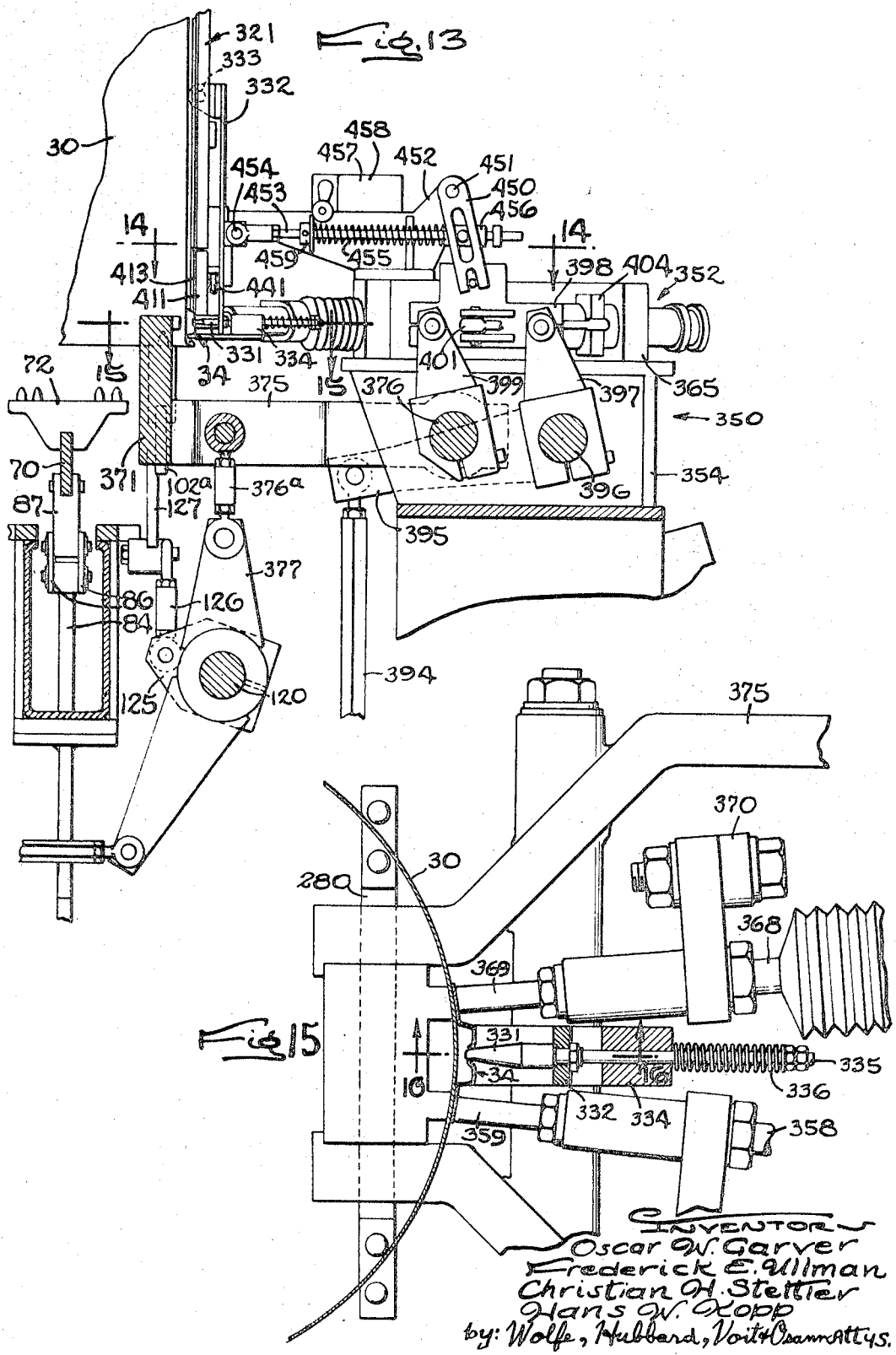

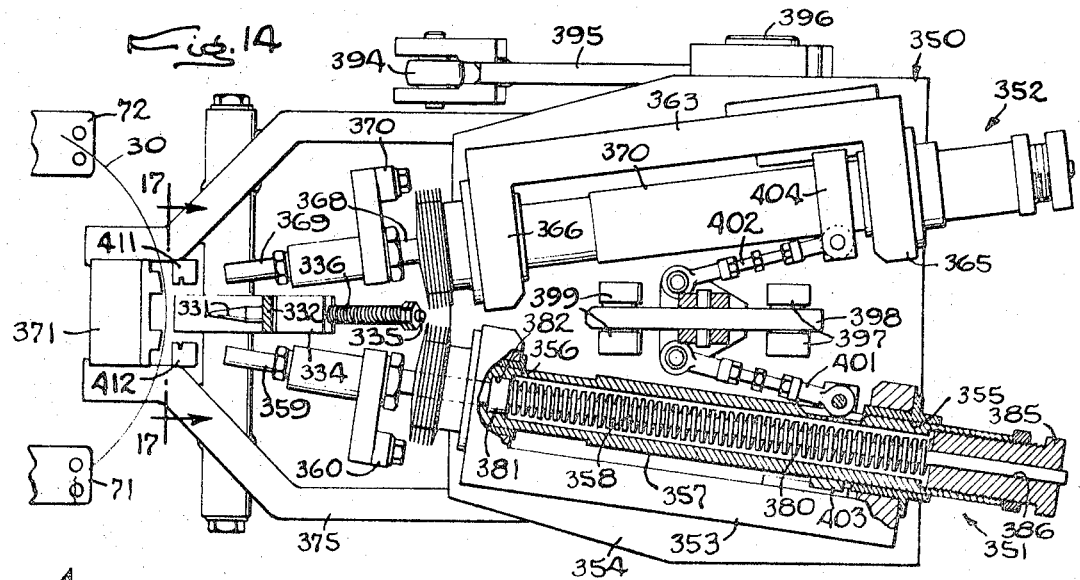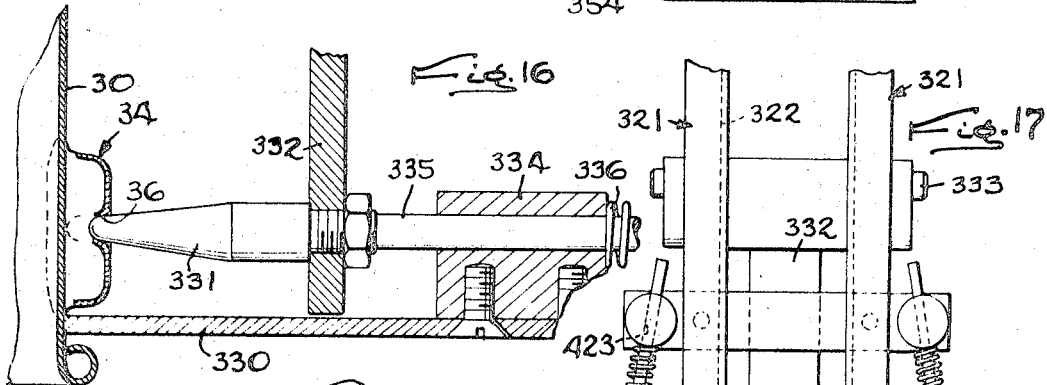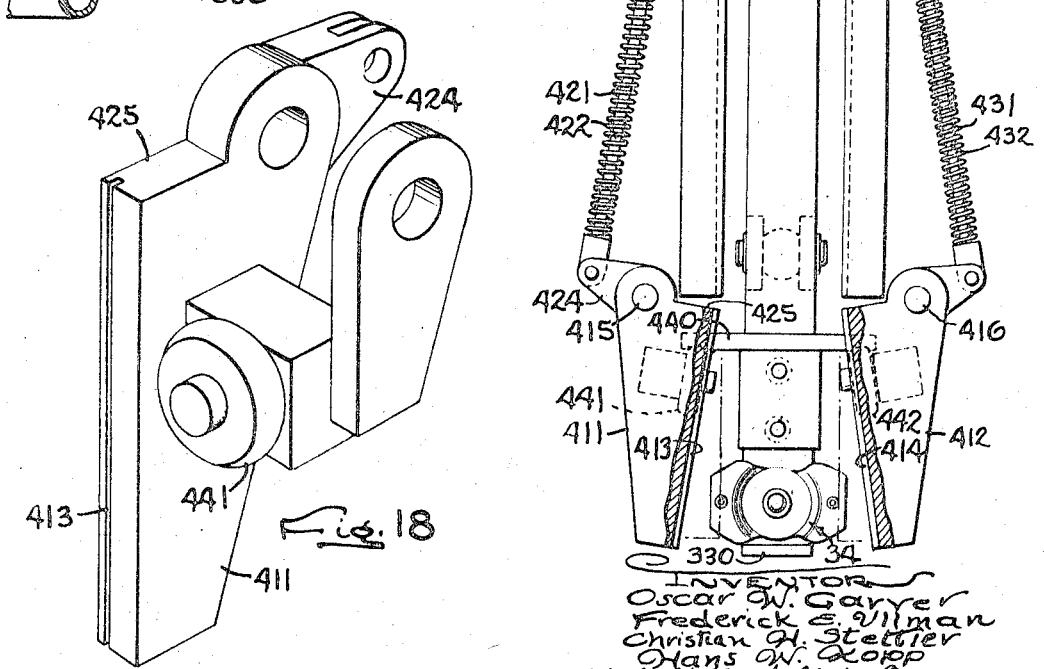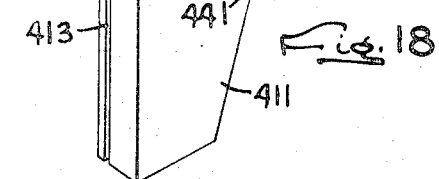

INVENTORS
OSCAR W. GARVER
FREDERICK E. ULLMAN
CHRISTIAN H. STETTLER
HANS W. KOPP
by: Wolfe, Hubbard, Voit & Osann
ATTYS.

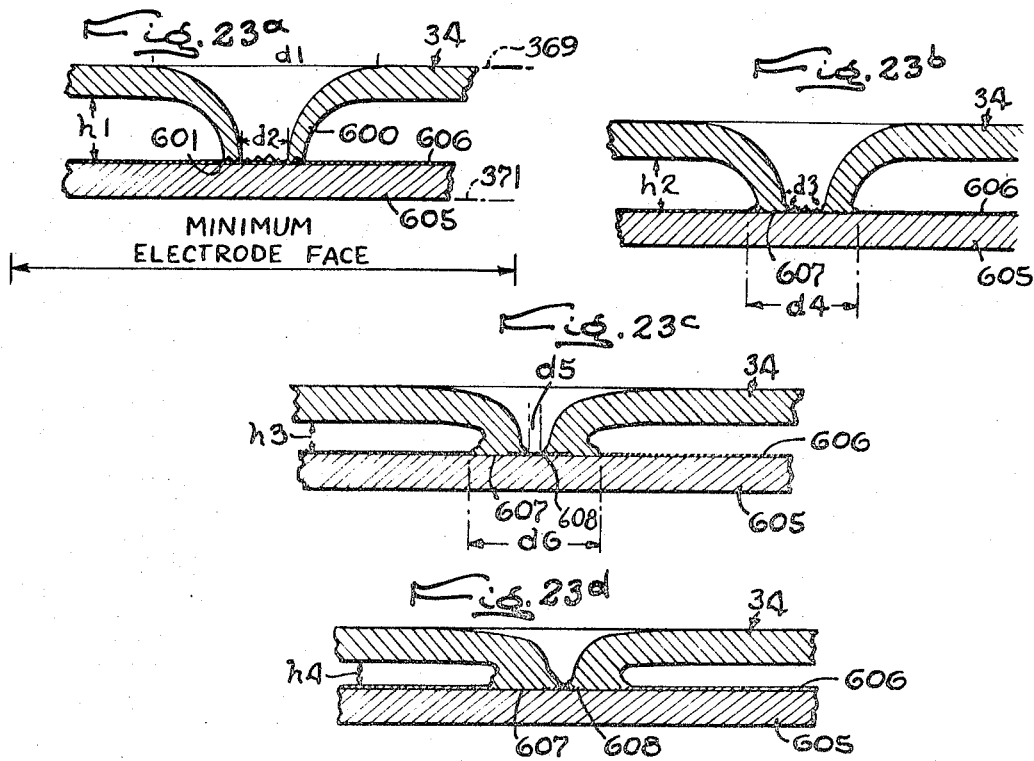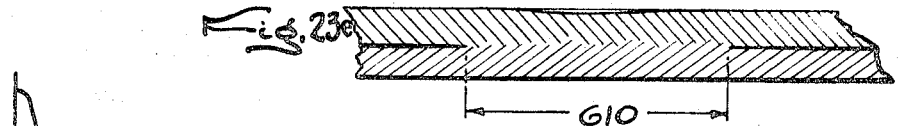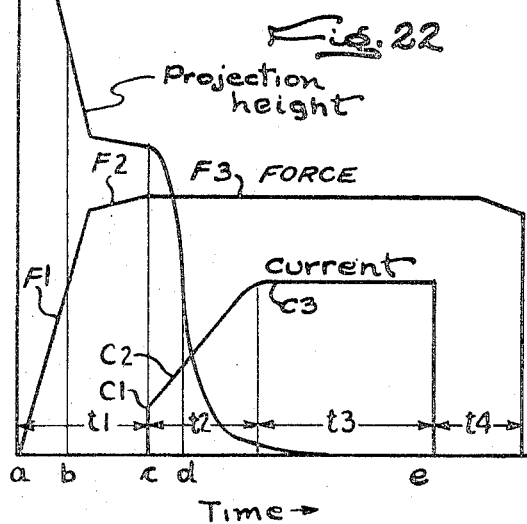

3,553,418

WELDING MACHINE AND PROCEDURE FOR WELDING ATTACHMENTS TO BASE MEMBERS AND HAVING PROVISION FOR CHECKING FOR THE PRESENCE OF A WELDED ATTACHMENT AND THE ADEQUACY OF THE WELD

CROSS REFERENCE TO RELATED APPLICATIONS

The present application is divisional application based on the copending application of Oscar W. Garver, Frederick E. Ullman, Christian H. Stettler and Hans W. Kopp, Ser. No. 463,062, filed Apr. 29, 1965; now U.S. Pat. No. 3,490,904 such patent having been a divisional application based upon the then copending application of the same inventors, Ser. No. 10,415, filed Mar. 15, 1962, and issued as U.S. Pat. No. 3,233,072 on Feb. 1, 1966; all assigned to the assignee of the present invention.

BACKGROUND OF THE INVENTION

The present invention relates to welding machines and procedures and, more particularly, to machines and procedures for welding attachments to base members. In its principal aspects the present invention is concerned with improved welding apparatus and procedures having provision for checking for the presence of an attachment properly welded to a base member, as well as for checking the adequacy of the weld, and for signalling the detection of a defective condition. While not so limited in its application, the attachments may conveniently take the form of ears and the base members may conveniently take the form of pails.

In the manufacture of metal shipping pails, it is conventional to weld ears or projections to the sides of the pail for receiving the ends of a wire bail. The ear may be in the form of a cup-shaped stamping having a central opening for the bail and having lateral projections which seat against the side of the pail. Since the pails are commonly made of sheet steel, it is desirable to protect or decorate the outer surface either by painting or by lithographing which, in addition to providing physical protection, often serves to identify the contents, to provide a colorful, attractive appearance, and to carry an advertising message. It is desirable that the painted or lithographed coating be applied to the side of the pail while it is still flat, prior to welding. Moreover, it is desirable that the coating be continuous, covering all of the surface area. This requires that the bail ears be secured after the coating has been applied, so that any spot welding of the ears must take place through the coating. Efforts have been made in the past to weld an ear or other attachment to a painted surface by forming, on the attachment, a sharp projection so that when pressure is applied, the projection establishes electrical contact to permit flow of welding current. However, it has not been possible to "weld through" an insulating coating with 100 percent reliability. Consequently, use of this procedure has been limited to containers having thin walls and where the strength of the weld has not been an important factor, for example, in the welding of a key to the lid of a coffee can. One difficulty which has been experienced in this type of welding is the "-flashing" which takes place when the initial electrical contact is made between the sharp projection and the base resulting in overheating and destruction of the projection, with inability to complete the weld.

Welding through an insulating coating has been avoided in the case of shipping pails because of inability to make a consistent weld, because of the high degree of strength required in the weld, particularly when the pail is to be filled with a dense, heavy substance, and the inability to properly inspect the weld for soundness.

It is an object of the present invention to provide a welding machine which is not only capable of producing a reliable weld but which is extremely rapid, a single machine being capable of processing shipping pails at the rate of 2,400 units per hour or even higher. It is a more specific object in this connection to provide an automatic machine in which the positioning, welding and weld checking procedures are performed in steps at successive work stations, with the pail being indexed from station to station and with a plurality of containers being acted upon simultaneously in the successive stations.

In its principal aspects, it is an object of the invention to provide an automatic welding machine and procedure for welding attachments on base members on a quantity production basis, yet wherein provision is made for continuously checking the adjustment of the machine without requiring unnecessary shutdown or interruption in the flow of completed units. In this connection, it is an object of the invention to provide an improved welding machine and procedure for welding one or more attachments on base members on a high-speed production basis, and wherein the products discharged from the welding station are automatically checked or tested both to determine whether the attachment has been welded to the base member in the desired position and whether the weld is adequate to withstand the usage for which it is intended.

It is yet another object related to the foregoing to provide a machine and procedure for welding attachments to base members which tests for the presence of the welded parts and the strength of the welded connection upon completion of a welding operation, and wherein provision is made for disabling the machine, sounding an alarm, or otherwise signalling the detection of products which fail to pass the test. A more detailed object of the invention is the provision of a machine and procedure of the foregoing character which signals the existence of the defective condition only after detection of a number $n$ of defective products in succession.

Other objects and advantages of the invention will become apparent upon reading the attached detailed description and upon reference to the drawings, in which:

FIG. 1 shows a shipping pail with a bail ear affixed by the present machine;

FIG. 1a is an enlarged perspective showing one of the ears;

FIG. 2 is a front elevation of an ear welding machine constructed in accordance with the present invention somewhat simplified for easy understanding;

FIG. 4 is a diagram showing the linkage for driving the positioning members;

FIG. 5 is a fragmentary front view of the machine showing the cams for driving the transfer and positioning members;

FIG. 6 is a fragmentary perspective showing the ear escapement;

FIG. 7 is a fragmentary section taken along the line 7-7 in FIG. 6;

FIG. 8 is a fragmentary face view in partial section showing the pail orienting mechanism;

FIG. 9 is a fragmentary section taken along line 9-9 in FIG. 8 showing the first seam detector;

FIG. 10 is a fragmentary section taken along the line 10-10 in FIG. 8 showing the seam detector switch;

FIG. 11 is a fragmentary top view of the star wheel employed in the first seam detector;

FIG. 12 is a fragmentary section taken along the line 12-12 in FIG. 8 and showing the final seam detecting element;

FIG. 13 is a section taken along the line 13-13 in FIG. 2 showing the means for moving the welding electrodes;

FIG. 14 is a fragmentary section taken along the line 14-14 in FIG. 13 showing the electrode advancing means in plan view;

FIG. 15 is a fragmentary section taken along the line 15-15 in FIG. 13 showing the electrodes in welding position;

FIG. 16 is an enlarged fragment showing the function of the centering pin and supporting table;

FIG. 17 is a vertical section taken along line 17-17 in FIG. 14 showing the opening of the gates to admit the welding electrodes;

FIG. 18 is a perspective of one of the gates;

FIG. 19 is a section taken on the line 19-19 of FIG. 2 showing the ear checking arm;

FIG. 20 is a view similar to FIG. 19 with the parts in a moved position;

FIG. 22 is a plot showing the variation in applied force projection height and current as a function of time; and FIGS. 23a—23e are enlarged sections of a typical weld at successive points in the welding cycle keyed to FIG. 22.

Figure 3:
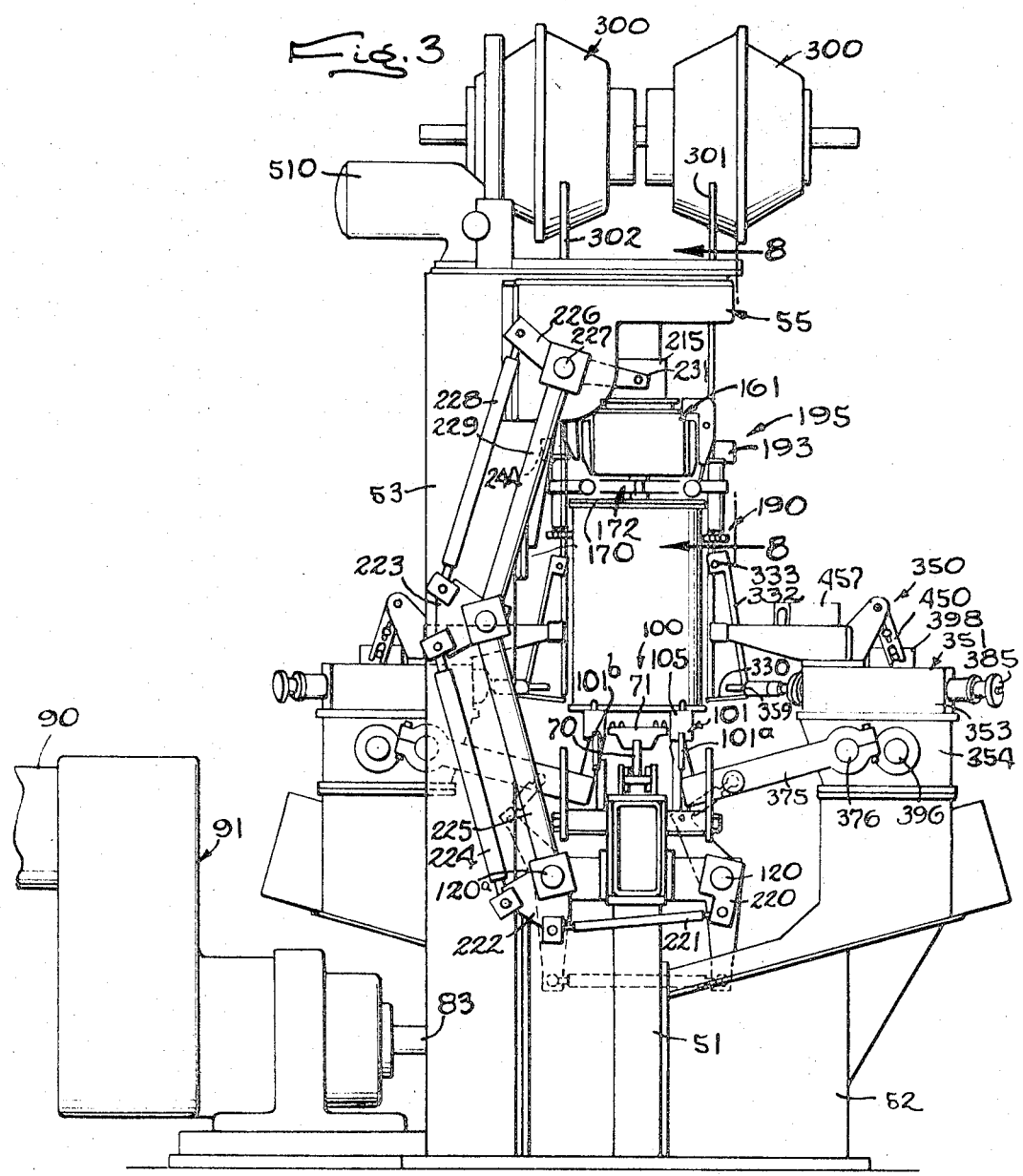
FIG. 3 is a left-hand elevation of the machine shown in FIG. 2.

While the invention has been described in connection with a preferred embodiment, it will be understood that we do not intend to limit the invention to the embodiment shown but intend, on the contrary, to cover the various alternatives and equivalent constructions included within the spirit and scope of the appended claims.

Turning now to FIG. 1 there is shown, inverted, a shipping pail 30 of well-known type having a top curl 31, a bottom flange 32 and a seam 33. Located on opposite sides of the pail are bail ears 34, only one of which is visible in the FIG. The machine to be described is primarily intended for welding such ears in place upon a prepainted or prelithographed pail, although those skilled in the art will appreciate that it is not limited thereto. While the invention is not limited to any particular form of bail ear, a preferred form of ear (FIG. 1a) includes a cup-shaped central portion 35 having a central opening 36 for receiving the end of the bail and having tabs 37, 38 for spot welding to the wall of the pail.

The machine, generally indicated at 50, has a longitudinal frame 51 supported on a base 52. Extending upwardly at the rear of the frame are pillars 53, 54 which support a superstructure 55 in adjusted vertical position. Pails 30 enter the machine at the left from an external conveyor and, as will be described, each pail successively occupies a series of work stations in which the pails are acted upon. In the machine described, there are a total of six work stations indicated at 61—66, respectively, in which the pails are first oriented, then welded and, finally, tested. For the sake of versatility and for optional functions or specialized purposes, two of the stations, in the present instance stations 63 and 66, are idle. It will be understood, however, that the pails pass through the machine at closely spaced sequence so that all of the stations at any given time have pails positioned therein.

While the various functions performed by the machine are closely integrated, it will, nevertheless, be convenient for easy understanding to discuss the functions of the machine under separate appropriate subheadings.

PAIL TRANSFER AND POSITIONING MECHANISM

In carrying out the present invention a longitudinal pail transfer member is provided which extends under all of the stations and which reciprocates back and forth through a unit station-to-station distance for the purpose of engaging the downwardly presented facing edges of the pails and for moving all of them simultaneously to the next station. Cooperating with the transfer member is a longitudinally extending positioning member having means for moving the same vertically between a lowered inactive position, at which time the pails are engaged by the transfer member, and an upraised active position in which the pails are firmly held clear of the transfer member so that the latter is free to make a return stroke. The transfer member in the present instance is in the form of a longitudinally extending bar 70 mounted on rollers 73, 74 (FIG. 19) for endwise movement in the machine and having a plurality of pail engaging members or lugs 71—72 secured to its upper edge. A pair of cams are employed for moving the transfer member in opposite directions. Thus, as shown in FIG. 5, drive cams indicated at 81, 82, mounted on a cam shaft 83 act upon a bellcrank 84 which is pivoted for rocking movement about a shaft 85. At its upper end the crank is connected to a link 86 which, in turn, is pivoted to a bracket 87 clamped to the transfer member 70. For the purpose of driving the cam shaft 83, a motor 90 is used having a speed reduction unit 91.

For the purpose of moving the pails upwardly and clear of the transfer member 70 into a position to be acted upon, a positioning member 100 is provided having spaced sections 101, 102 which move upwardly and downwardly in unison. The positioning member is formed in two longitudinal sections in order to permit separate vertical positioning of the pail in the welding station as will be discussed in detail.

In order to provide a wide base for positioning purposes, the sections 101, 102 have corresponding spaced sections 101a, 101b, 102a and 102b which straddle the transfer member 70 as shown in FIG. 3. Means are provided along the top edge of each section for engaging the lower edge of the pails. Such means may take the form of lugs 105 or may take the form of rollers in the orienting stations 61, 62 to be discussed. To understand the means for bodily raising and lowering the positioning member 100, it will be noted that cams 111, 112, mounted on shaft 83 and disposed immediately behind the cams 81 and 82 previously discussed, act upon a cam follower in the form of a bellcrank 114 having a shaft 115. Connected to the outer end of the bellcrank 114 is a pushrod 115 which is pinned to an arm 117 secured to a longitudinally extending rocker shaft 120 which is journaled at its end in suitable bearings 121. To convert the rocking movement of the rocker shaft 120 to vertical movement of the positioning member, the shaft is provided with lift arms along its length having short links which are coupled to the sections of the positioning member and with radius arms being provided to insure that the elevation is equalized. Thus the shaft 120 has lift arms 125 carrying short links 126 which are connected at their upper ends to brackets 127 on the section 102a. For the purpose of transmitting equal movement to the section 102b, the bellcrank shaft 115 has an arm 114a which drives a pushrod 116a pinned to an arm 117a on a rocker shaft 120a which extends along the rear of the machine. The rocker shaft 120a corresponds to the rocker shaft 120 previously discussed. To elevate section 102b the pushing member of the rocker shaft 120a has arms 125a which act upon short links 126a which are connected at their upper ends to brackets 127a along the underside of the member 102b.

It will be apparent, then, that when the cams rotate the members 102a and 102b will be moved upwardly through equal distances. To insure that the members are guided in this upward movement, pairs of swingable radius arms 129 are provided for each of the sections, forming a parallelogram linkage.

While the above structure suffices for elevating the sections 102a, 102b of the positioning member 100, it will be understood that similar structure is employed for elevating the two sections 101a, 101b and with corresponding reference numerals being used where applicable.

Since cams 81, 92 which reciprocate the transfer member and the cams 111, 112 which move the positioning member 100 vertically are offset in phase, it will be seen from FIG. 3 that the effect is to advance the pails simultaneously step by step. Taking the first station 61 by way of example, when the positioning member 100 is upraised, the lugs on the transfer member are moved to the left to a position under the entering pail. When such entering pail, indicated at 30a in FIG. 2, is lowered by the positioning member, it seats on the lugs 71 and 72. The transfer member 70 then moves to the right until the pail is in the first station 61 whereupon the transfer member momentarily comes to rest. The positioning member 100, as a result of the cams 111, 112 and the linkage just described, moves vertically, lifting the pail clear of the transfer member and in position to be acted upon in the first station. Each of the other pails in the series is similarly advanced one step.

In order to feed a pail into the machine and to remove a pail having welded ears from the machine, conveyor chains are provided at both the input and output. Referring to the input end, a conveyor chain 140, which preferably consists of two parallel sections is trained about shafts 141, 142, the shaft 142 being preferably mounted on the positioning member 100 for movement up and down therewith. For driving the conveyor chain 140, a drive chain 143 is provided which is driven by a second chain 144 coupled to the driving motor. A similar setup is employed at the output, with a conveyor chain 150 being trained about shafts 151, 152 and driven by chains 153, 154.

ROTARY ORIENTING MECHANISM

In the exemplary apparatus, and as disclosed and claimed in our aforesaid copending application Ser. No. 463,062 filed Apr. 29, 1965, provision is made at the first station 61 for rotating the pail at relatively high speed to an approximate position of orientation as determined by a weld bead on the side of the pail and at the second station for rotating the pail at a substantially slower speed to achieve precise orientation. In order to understand the mechanism for accomplishing such two-step orientation, reference is made to FIGS. 2 and 8—11 and the schematic control diagram FIG. 21. Mounted on the superstructure 55 and centered with respect to the stations 61, 62 are rotating mechanisms 161, 162. Attention will first be given to the rotating mechanism 161. The mechanism 161 is mounted upon a downwardly extending pedestal 163 carrying a cylindrical housing 164 at its lower end. The housing 161 has an outer shell for an adjusting purpose which will become clear as the discussion proceeds. Centered within the pedestal 163 is an input drive shaft 165, and projecting downwardly therefrom is a disc drive shaft 166. Coupled to the lower end of the disc drive shaft 166 is a drive disc 170 having a layer of rubber or other friction material 171 on its under surface for engaging the presented upper edge of a pail 30. Downward pressure is exerted upon the disc 170 so that the disc seats firmly against the pail by means of a resilient connection 172 which is interposed between the drive shaft 166 and the disc. The resilient connection 172 is preferably in the form of a resilient spider, a construction well known to those skilled in the art.

For the purpose of controlling rotation of the disc, a clutch 175 is interposed between the input shaft 165 and the output shaft 166 and, to bring the output shaft to a stop on the plate when the clutch is disengaged, an electric brake 176 is provided. The combined clutch and brake together form a commercially available unit. To supply rotative power for the input shaft 165, to rotate the same at a speed of approximately 50 r.p.m., a reduction drive is provided which includes a drive motor 180, a right-angled stepdown connection 181 having a downwardly extending output shaft 182. Mounted on the shaft 182 is a spur gear 183 which meshes with a spur gear 184 at the upper end of the shaft 165. In order to permit rotation of the pail under the urging of the drive disc 170, rollers 185, which may be made of nylon or the like, are mounted along the upper edge of the positioning member 100.

In order to detect the arrival of the pail seam at a predetermined point, and to deenergize the clutch and energize the brake when this occurs, a detector is provided in the form of a sharp edged member which is biased against the side of the pail and which operates an associated switch when the sharp edge is engaged by the seam. Turning to FIGS. 10 and 11 the detector element is in the form of a star wheel 190 mounted upon a shaft 191 carrying a cam 192 at its upper end for operating a switch 193. The shaft, as shown in FIG. 9, is mounted in a carrier 195. For biasing the carrier in the direction of the pail, the carrier is mounted upon a lever 196 which is pivoted at its upper end 197 and which is engaged by a coil spring 198. Thus while the pail rotates, the star wheel 190 presents an edge 190a in the path of movement of the seam 33 on the pail. It will be understood by one skilled in the art that even where a flush-type seam is employed, nevertheless, there is a narrow rather sharply defined groove on the surface of the pail capable of engagement by the star wheel. When the seam rotates to the position shown in FIG. 11, the point 190a of the star wheel enters the seam groove causing the star wheel to step one step in the counterclockwise direction. The cam 192 at the upper end of the star wheel shaft thereupon actuates the switch 193 which, through the control circuit to be described, serves to disengage the clutch and energize the brake to bring the pail to a stop.

Means are provided for retracting the seam detector to an upper, out-of-the-way position during station to station transfer and for lowering the detector when a pail is in the orienting station. To understand the retracting means reference is made to FIGS. 3, 8 and 9. It will be noted that the detector assembly is not rigidly secured to the housing of the rotating mechanism, but, instead, is mounted upon a vertical slide 210 which engages way surfaces 211 secured to the housing member outside of the housing 161. For moving the slide 210 upwardly and downwardly, a positioning collar 215 is provided which surrounds the pedestal 163 and which is slidable thereon. Formed in the lower portion of the collar 215 is an annular groove 216 which is engaged by a roller 217 pinned to the slide 210. Thus, it will be apparent that when the collar is raised, the slide 210, and the detector assembly secured to it, is also raised, this condition being illustrated in FIG. 9. For the purpose of moving the collar 215 upwardly during each transfer cycle, a linkage is provided which is operated by the rocker shaft 120. Such linkage includes an arm 220 (FIG. 3) which is connected to a pushrod 221 operating a bellcrank 222. Motion is transmitted from the bellcrank 222 to a second or intermediate bellcrank 223 by a parallelogram linkage made up of links 224, 225. Motion is transmitted from the bellcrank 223 to a final bellcrank 226 which is rotatable about a shaft 227 via a second parallelogram linkage made up of parallel links 228, 229. For the purpose of transmitting the rocking movement of the shaft 227 to the collar 215, arms 231, 232 (FIG. 8) are secured to the shaft, carrying rollers 233, 234 at their forward ends which ride in an annular groove 235 at the upper end of the collar.

Provision is also made for camming the detector radially outward away from the pail as it is upraised for the purpose of clearing the flange at the end of the pail and the drive disc which engages it. In FIG. 9 it will be noted that the spring-biased arm 196 which carries the detector element has a roller 240 which rides on the surface of the way 211 and acts as a cam follower. Thus, when the detector is drawn upwardly, the roller 240 rides up on the way swinging the detector outwardly. Conversely, when the collar 215 is lowered the roller 240 reaches the lower end of the way 211 providing "drop off" so that the spring 198 is effective to bias the detector element against the side of the pail.

It will be apparent, then, that upon rotation of the rocker shaft 120 in one direction the detector will be moved downwardly and inwardly into contact with the pail and, upon movement in the other direction, i.e., during transfer, the detector will be moved outwardly and upwardly to an out-of-the-way position. Because of the dual parallelogram linkage just described, it is possible to adjust the height of the superstructure 55 to accommodate pails of different heights, without necessity for readjusting the angling of the collar actuating arms 231, 232. The superstructure adjusting means will be covered at a later point.

For the purpose of limiting maximum rotation of the pail to less than 180°, it will be understood that a duplicate of assembly 190 having a switch 244 is provided in a diametrically opposite position (see FIG. 3). As will be observed in the control diagram FIG. 21, operation of the switch in either of the detector assemblies suffices to terminate rotation of the pail. Stopping the pail at either of two 180° positions is permissible since the ears to be welded to the pail are fixed in symmetrical 180° positions. For the purpose of simultaneously positioning the detector assemblies 190, 190a, the associated way elements are secured to an outer shell 245 of the orienting drive housing 161. A manually operated clamping screw 246 serves to clamp the outer shell 245 and the two detector assemblies in any position depending upon the desired position of the bail ears.

The net effect of the orienting mechanism in the first station 61 is to produce approximate orientation of the pail, say, within one-quarter inch of the desired position on the periphery. Such orientation is approximate because of the relatively high speed of rotation of the drive disc 170 required to bring about a rotation of up to 180° in the short time that the pail is in the station. The degree of overtravel after cutoff is to some extent dependent upon whether the pail has been rotated to a large angle or a small angle prior to cut off.

In the illustrative apparatus, means rotating at a substantially slower speed are provided in the second station in order to achieve final and exact positioning. Since the orienting mechanism employed in the second station is a substantial duplicate of that in the first, except for the speed of rotation and the construction of the detector element, corresponding reference numerals have been employed to identify corresponding parts with addition of subscript $a$. To achieve a slower speed, on the order of 6 r.p.m. a stepdown ratio has been employed in the gears 183$a$, 184$a$, as contrasted with the step-up ratio in the gears 183, 184 in the companion unit. With regard to the construction of the slow speed detector, the element, indicated at 250 in FIG. 12, has a sharp detecting edge 251 and is mounted upon a parallelogram linkage which includes links 252, 253. The link 253 is connected to a vertically extending shaft 254 which controls switches 255, 256. The switch 255 is so adjusted as to operate immediately upon the sharp edge 251 being engaged by the seam whereas the switch 256 is adjusted to operate only after a predetermined amount of overtravel. The effective "spacing" between the switches 255, 256 determines the positional tolerance, i.e., as long as the orientation is within prescribed limits, an ear will be welded to the pail. However, and as covered in the later section, in the event that the switch 256 is operated, indicating that the tolerance is exceeded, provision is made for preventing a weld so that the pail may be removed from the production line and inserted again at the input side of the machine. Moreover, means are provided for registering the number of successive pails which are outside of the tolerance, i.e., without ears, and for sounding an alarm or shutting off the machine when a predetermined number has been exceeded, all as later covered in detail.

Using the above construction, with approximate and exact orientation in successive stations, orientation may be achieved within a peripheral tolerance on the order of 0.080 inch consistently and at high speed. Upon subsequent lowering of the pail by the positioning member, the pail is advanced into the next station 63. This station, in the present construction, is an idle one in that no operation is performed upon the pail. However, this station contributes to the versatility of the machine in that any desired operation, requiring an oriented pail, may be performed at this point. For the purpose of holding the pail securely in station 63 when it is upraised by the positioning member, a stationary disc 260 is provided mounted upon a plunger 261 which is telescoped into a bushing 262. A coil spring 263 interposed between the bushing and the disc biases the disc downwardly.

POSITIONING OF PAIL AND EARS IN WELDING STATION

Means are provided within the welding station 64 for accurately positioning bail ears on opposite sides of the oriented pail in position to be acted upon by the welding guns. Prior to describing the ear positioner, consideration may be given to the means employed for positioning the pail at a proper height. It is one of the features of the illustrative welding machine that a separate adjustable positioner is provided in the welding station to enable variation in the height of the ear on the pail and as necessary to avoid reinforcing beads which may be formed in the wall of the pail. Thus, there is provided, as shown in FIG. 5, a vertical positioning member 280 which is mounted for vertical movement on vertical ways 281, 282.

A linkage connects the positioning member 280 to the rocker shaft 120 so that the movement is coordinated and timed with the movement of the transfer member 70 and positioning member 100 previously discussed. This linkage in the present instance includes an arm 283 which is secured to the rocker shaft and which is connected to a bellcrank 284 having a pivot point 285. A second bellcrank 286 has a pivot point 287. Means are provided for varying the effective point of connection between the bellcranks 284, 286. In the present instance this is accomplished by providing a pivot block 288 in the bellcrank 286 with an adjusting screw 289 for adjusting the throw. It will be apparent that the adjustment 289 enables the positioning member 280 to reach any desired height at the top of the stroke at which point the ears are affixed.

For the purpose of holding the drum in position in the welding station, a disc 290 is mounted upon a shaft 291 slidable in the bushing 292, with the disc being urged downwardly by means of a coil spring 293 surrounding the shaft.

Attention will next be given means for depositing an ear on each side of the pail timed with the advancement of a pail into the welding station. For the purpose of orienting the ears to face the pail, an orienting device 300 (FIGS. 2 and 3) is employed having downwardly extending chutes 301, 302 respectively. The orienting device does not per se form a part of the present invention and it will be understood that any suitable orienting arrangement, taken from the prior art, may be employed. Moreover, it will be understood that conveyor means, for example, of the magnetic belt type, may be provided for elevating the ears from a bulk source to the orienting device 300. Since the feeding arrangements for the two sides of the pail are identical, attention may be focused upon that visible at the front of the machine as best illustrated in FIGS. 6 and 7. At the lower end of the chute 301 is an escapement 310. The escapement includes a rocking assembly 311 which is oscillated about a pivot 312 by means of a link 313 which is connected to solenoid operators having input coils 314, 314$a$. For the purpose of accepting an ear from the chute 301 at one end of the stroke and for releasing the ear at the other end of the stroke, the escapement member 311 includes a flat leaf spring member 317 having a retaining forward edge 318 mounting a cam follower 319 which cooperates with a stationary cam surface 320. It will be apparent that with an ear in the position shown in FIG. 6, clockwise rotation of the escapement will cause the cam follower 319 to approach the cam 320. When engagement takes place, the cam follower is cammed laterally bending the leaf spring 317 so that the edge 318 thereof moves out of the way of the ear, whereupon the ear is permitted to fall through a final vertical slide chute 321. Preferably, the sides of the chute 321 are grooved as indicated at 322 so that the ear is positively guided in its downward movement. The escapement member includes an obstructing face indicated at 325 which holds the next succeeding ear, indicated by the dot-dash outline, in the position shown until the escapement member has fully retracted, whereupon such ear drops into place in readiness for a subsequent discharge cycle. Control circuits for energizing the coils 314, 314$a$ of the solenoid will be discussed in detail in connection with consideration of FIG. 21. It will suffice for the present to say that reload of the escapement is disabled whenever the pail is not in proper orientation, i.e., whenever the switch 256 is actuated indicating that the positional tolerance has been exceeded.

In the illustrative apparatus, and as best illustrated by reference to FIGS. 13—17 conjointly, means defining a supporting table are provided for catching the ear as it descends down the final chute 321 and for supporting the ear at the proper height in horizontal position. Moreover, means including a tapered positioning pin are provided for entering the bail opening and for precise final centering of the ear just prior to engagement by the welding electrodes. Thus, there is provided at the welding station a locating table 330 and a tapered centering pin 331 with means for bringing them into operation sequentially. Sequential operation is brought about by mounting both of the elements on a vertically arranged positioning arm 332 having an upper horizontal axis 333 and by providing a resilient mounting to hold the table in projecting position. Thus, in the present instance the table 330 has a mounting block 334 which is slidable on a rearwardly projecting rod 335 and which is biased to a forward position by a spring 336. Accordingly, as the centering arm 332 is swung forwardly, i.e., in the direction of the pail, the table 330 first engages the wall of the pail to provide a positive stop for the advancing bail ear 34. Upon continued inward movement of the arm 332, the tapered centering pin 331 enters central opening 36 in the ear so that the ear centers itself with respect to the pin. Since the pail is rotationally oriented with respect to the machine, and since the ear is thereby positioned with respect to the machine while being held horizontal, it will be apparent that precise location of the ear on the side of the pail is assured. Means are provided for swinging the positioning arm timed with the movement of the welding guns as covered in the following section.

CONSTRUCTION AND ACTUATION OF WELDING GUNS

In the welding station two separate welding gun assemblies 350 are provided, one at the front of the machine and one at the back, each consisting of two sets of electrodes so that both of the ears are welded simultaneously. Since the two assemblies are substantially identical, detailed attention may be given to the assembly at the front of the machine. In the exemplary welding system, the piece to be welded is provided with a sharp projection at each point of welding for penetration of a protective, or insulating coating on the pail, and means are provided for advancing the welding electrodes by positive mechanical action to develop a force sufficient to cause penetration of the coating by the projection followed by substantial collapse of the projection before welding current is applied, thereby to produce a sound weld free of any tendency toward "flashing," or burning away, of the projections. To make the two welds, the welding assembly 350 has two welding guns 351, 352. The first gun 351 is mounted on a bracket 353 secured to a frame 354. The bracket is of C shape having guide portions 355, 356. Mounted for sliding movement in the bracket is a cylindrical electrode carrier 357 mounting a rod 358 which projects forwardly, carrying an electrode 359 having a terminal 360.

The second gun 352 is mounted in a bracket 363 having ends 365, 366 for the slidable mounting of a cylindrical electrode carrier 370 having a rod 368 terminating in an electrode 369 and terminal 370a. The return circuit for the electrodes 369, is completed through a relatively stationary electrode 371.

Means are provided in the present construction for cyclically retracting the electrode 371 downwardly so that it is out of the way of a pail being advanced into the welding station and for then moving the electrode upwardly to a position within the pail after the pail comes to rest. In the present instance this is accomplished by mounting the return electrode 371 at the end of an electrode arm 375 which is pivoted to the base 354 upon a shaft 376. Extending downwardly from the arm 375 is a drop link 376a which is connected to an arm 377 mounted on the rocker shaft 120. It will be apparent that when the rocker shaft rocks during the transfer portion of the cycle, the arm 375 and its electrode 371 are swung downwardly clear of the advancing pail and swung upwardly again to the position shown when the pail is clamped in the welding station.

Means including a stiff preloaded spring are provided for positively advancing the welding electrodes and for maintaining the electrodes clamped securely against the ear prior to, and during, the welding cycle. Thus, referring to FIG. 14, a spring 380 is mounted within the cylindrical carrier 357 surrounding the rod 358. The rod is formed with an enlargement 381 which is normally seated in a recess 382 formed in the forward end of the cylinder. The spring is compressed at its rear end by a preload adjusting member 385 which is in the form of a bushing threaded into the end of the cylinder 357, the bushing having a central bore 386 for clearing the rod 358. It will be apparent, then, that when the bushing 385 is screwed into the end of the cylinder, the spring is compressed to exert a substantial force, which in a practical case may be on the order of 350 lbs. against the enlargement 381 on the rod.

Thus, when the carrier cylinder 357 is advanced forwardly, and the electrode strikes the workpiece, there is an immediate buildup of force against the workpiece until the force is sufficient to lift the rod from its seat 382 against the force exerted by the preloading spring. A spring pressure of at least the value of the preload then continues to be exerted against the workpiece during the remainder of the welding cycle. It will be understood that an identical preloaded spring arrangement is included within the cylinder 367 associated with the companion welding electrode.

For the purpose of advancing the electrode carriers with positive mechanical action for complete overcoming of inertial effects, as contrasted with the nonpositive action of an air cylinder or the like, a driving linkage is employed including a cam and overdriven cam follower driven by the cam shaft 83. Thus, there are mounted on the shaft 83 a pair of cams 391, 393 which cooperate with a cam follower lever 393a to reciprocate a vertical link 394. The latter drives a bellcrank 395 which is mounted for rocking about a shaft 396. The upwardly extending portion 397 of the bellcrank is pinned to the reciprocating bar 398. For the purpose of insuring substantially pure reciprocation, a second vertical link 399 is provided which is pivoted on the shaft 326 and which serves to complete a parallelogram. In short, rotation of the cam shaft causes the bar 398 to reciprocate backwardly and forwardly. For the purpose of coupling the reciprocating bar to the electrode mounting cylinders, short links 401, 402 are provided in the form of turnbuckles which are secured at their forward ends to the bar 398 and which are connected at their rear ends to clamps 403, 404 respectively which grippingly encircle the two cylinders. The walls of the cylinders may be grooved as necessary to accommodate or clear the rear ends of the links 401, 402.

As best shown by reference to FIGS. 17 and 18, gates are provided at the lower end of the chute 321 for the purpose of guiding an ear dropped by the escapement 310, to welding position together with means for moving the gates out of the way of the advancing electrodes 359, 369. Thus, two gates 411, 412 are provided having longitudinal grooves 413, 414 which serve to guide the ends, or welding tabs, on the ear 34. The grooves 413, 414, with the gates in normal position, are aligned with corresponding grooves in the chute 321. To mount the gates for outward swinging movement they are pivoted upon pins 415, 416 respectively. The gate 411 is held closed by a coil spring 421. The spring is mounted on a pushrod 422 which is guided at its upper end at 423 and which is pinned, at its lower end, to an arm 424 on the gate. The normal or closed position of the gate is defined by engagement of stop surfaces at 425. A corresponding spring 431 on a rod 432 serves the same purpose for the gate 412. In order to swing the gate apart a cam and cam follower are interposed between the gate and the centering arm 332 which carries the centering pin 331 previously discussed. Thus, there is provided on the centering arm a transversely positioned cam plate 440 engaging cam rollers 441, 442 mounted on the gates 411, 412 respectively.

Attention may next be given to the means employed for swinging the centering arm 332 to insure that it is timed with respect to the advancement of the electrodes. As shown best in FIG. 13, such arm is coupled to the reciprocating bar 398 which serves to drive the electrode supporting cylinders. Thus, connected to the bar 398 and extending upwardly therefrom is a link 450 which is pivoted at its upper end 451 on a frame bracket 452. For interconnecting the arm 332 and the link 450 a pushrod 453 is provided which is pinned to the arm at its forward end 454. The connection is made resilient by coil spring 455 surrounding the rod and which engages a slidable collar 456 pinned to the center of the link 450. It will, therefore, be apparent that when the bar 398 is moved forwardly, pressure is exerted by the link 450 upon the spring 455 to move the pushrod 453 in the forward direction so that the pail is engaged by the table, the ear is engaged by the centering pin and the gates are spread apart just ahead of the advancing electrodes.

Switches 457, 458 actuated by a cam surface 459 at the forward end of the pushrod are operated depending upon whether the pushrod goes too far or not far enough. The switch 458 thus signals the absence of an ear in the welding position while the switch 457 signals improper positioning, the welding guns being disabled in either event as will be discussed in connection with the control circuitry.

EAR CHECKING ARRANGEMENT EMBODYING THE PRESENT INVENTION

In accordance with the present invention, feeler means are provided for checking the presence of ears on the pail upon transfer of the pail from the welding station. More specifically, feeler arms are pivoted to the frame in the checking station 65 and moved inwardly toward the pail to engage the ears when the pail is raised by the positioning member 100. Referring to FIGS. 19 and 20, the feeler arm arrangement at the front and rear sides of the machine is shown in detail and it will be understood that the following description is applicable to both. Thus, the arm 470 is pivoted at 471 to the frame of the machine. At its upper end the arm carries a pivoted finger 472 having an ear engaging tip 473. For the purpose of adjusting the vertical position of the feeler member, the arm has two relatively slidable portions including a carrier 474 and with the relative position being adjustable by a control knob 475 which engages a nut 476 on the carrier. For the purpose of biasing the feeler member 472, a spring is provided, with the spring force being adjustable by means of a knob 478. Relative rocking movement between the feeler member and the arm when an ear is engaged is utilized to control a switch 480 as will be covered in connection with a discussion of the control diagram FIG. 21.

For the purpose of rocking the arm forwardly to place the feeler member in the path of upward movement of the pail, a cam 481 is provided on the shaft 120 engaged by a cam follower 482 which is pinned to the lower end of the carrier portion 474 of the arm. Thus, in a typical sequence it will be understood that the arm is rocked radially inward toward the pail so that the tip 473 is in the path of movement of the ear. Continued upward movement of the pail by the positioning member causes the spring to be compressed, with the rocking movement of the feeler member 472 accompanied by actuation of the switch 480. The pressure exerted by the spring 477 is sufficient so that there is insurance that any ear which passes the checking step will have a strength which is adequate for all normal usage of the resulting pail although the checking mechanism does not develop the full strength of the weld.

In order to hold the pail steady as it is acted upon by the feeler arms, a disc 490 is provided which is similar to that in the welding station. The disc is carried on a vertical shaft 491 slidably received in a bushing 492 and urged in a downward direction by a coil spring 493.

The last station 66 is an idle station which may be employed to perform an added operation on the pails thereby to increase the versatility of the machine. It includes a clamping disc 500 on a shaft 501 slidable in a bushing 502 and with the disc being biased downwardly by a spring 503. When the pail leaves the station 66 it is moved by the transfer member onto the conveyor 150. A reciprocating-type pusher mechanism may be employed to move pails laterally from the conveyor for reject purposes.

In the above discussion, it has been assumed that the mechanism has been adjusted for one size of pail. Means are provided for accommodating the machine to pails of different heights by raising or lowering the superstructure 55. Conveniently, this may be accomplished by a height adjusting drive including a motor 510 having an angular drive connection 511 for rotating shafts 512, 513 which extend along the top of the machine. Such shafts rotate worm driven nuts 514, 515 which cooperate with threaded jack screws 516, 517. It will be apparent, then, that simply rotating the motor in one direction or the other the superstructure may be moved upwardly and downwardly along way surfaces. As previously discussed this does not effect the adjustment of the rotary orienting mechanism because of the double parallelogram linkage employed in the latter.

INTEGRATED CONTROL CIRCUIT

Figure 21:
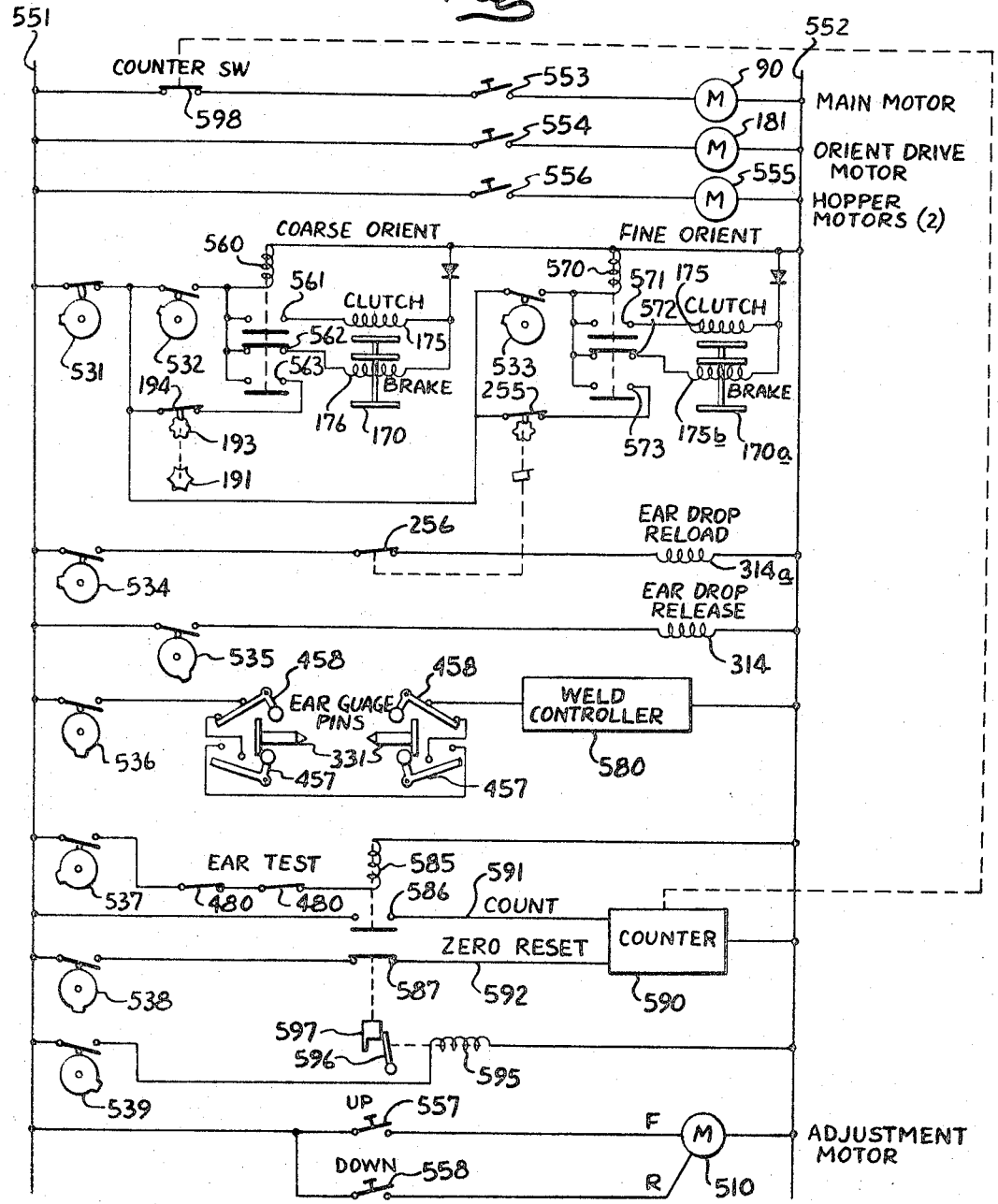
FIG. 21 is a simplified schematic diagram of the control circuit.

While the sequence of operation of the welding machine will be understood in the general way from the preceding discussion of the structure, it is one of the features of the present invention that the various functions are integrated in a novel fashion under the control of a control circuit which is set forth in simplified form in FIG. 21. To insure proper timing of the various functions we prefer to use a multiple section cam switch which is coupled to the cam shaft 83 at a 1:1 speed ratio. The cam switch is indicated generally in FIG. 2 by the numeral 530 and it may be conveniently driven by a suitable angular drive connection from the same chain 143 which serves to drive the conveyor 140. The various sections of the cam switch have been indicated in FIG. 21 at 531—539 inclusive.

Turning to FIG. 21, lines 551, 552 will be understood to be connected to the regular commercial supply line. In series with the main drive motor 90 is a switch or control 553. In series with the orienting motor 181 is a suitable switch 554. The motor 555 which drives the hoppers has a control switch 556. Finally, the adjusting motor 510 for adjusting height of the structure, which is of the reversible type, has "up" and "down" switches 557, 558. It will be understood that during the normal operation, control switches 553, 554 and 556 will be closed and the switches 557, 558 will be open so that the adjusting motor remains at a constant adjustment.

As the cam shaft 83 rotates to drive the transfer and positioning members 70, 100, pails will be transferred simultaneously into all of the stations. Directing attention to the pail in the first orienting station 61, the sections 531, 532 of the cam switch are closed, thereby closing the circuit to a "course orient" relay 560 having contacts 561, 562, 563. The contacts 561 are normally open and connected in series with the clutch 175 while the contacts 562 are normally closed and connected in series with the brake 176. The contacts 563 which are normally open, serve the purpose of "sealing in" contacts and are connected in series with the switch 194 controlled by the star wheel 190. Because of the "sealing in" contacts, the relay 560 remains closed, energizing the clutch 175 to rotate the pail engaged by the disc 170. When the seam of the pail arrives, tripping the star wheel 190, the switch 194 momentarily opens, dropping out the relay. This deenergizes the clutch so that the seal is stopped with the seam thereon approximately oriented in desired position.

Directing attention next to the pail in the "fine orient" station 62, there is provided a relay 570 having contacts 571, 572 and 573. The switch 255 of the detector 250 is connected in series with the contacts 573 which perform a sealing function. After a pail has been moved into the orienting station 62, the section 533 of the cam switch is closed, picking up the relay 570 and energizing the clutch 175a. This produces rotation of the disc 170a at slow speed because of the stepdown gear drive shown in FIG. 8. When the slow speed detector engages the seam of the pail, the switch 255 is opened dropping out the relay 570 which declutches the drive and energizes the brake 176b to locate the pail in a precisely oriented position.

For the purpose of dropping ears into the welding station, the escapement 310 shown in FIG. 6 is, as stated, operated by two solenoids 314, 314a under the control of the sections 534, 535 of the cam switch. The timing of the cam switches is such that the two solenoids are normally operated in sequence. Thus, the solenoid 314 will be operated to drop an ear, but before the next ear can be dropped the escapement must be reset by operating the "reload" solenoid 314a. In the exemplary apparatus, the "overtravel" switch 256, which is under the control of the slow-speed detector 250, is connected in series with the reload solenoid 314a. Consequently, the reload solenoid performs a memory function, i.e., no reloading of the escapement takes place to enable dropping of an ear in the succeeding cycle. To summarize, any overtravel of the pail in the final orienting station opens the switch 256 to prevent reloading of the escapement; consequently, when the misoriented pail reaches the next, or welding station, no ears will be dropped on either side of the pail for engagement by the gauge pins 331 to enable operation of the weld controller. The weld controller has been indicated at 580.

Turning attention to the weld controller circuit, it will be noted that the switches 458, which are normally closed, and the switches 457, which are normally open, associated with the gauge pins 331, are all connected in series with the section 536 of the cam switch. Thus, the cam switch, when the remainder of the circuit is completed, normally acts to energize the weld controller 580 to initiate the welding. The nature of the weld controller, and the particular sequence of force and current which is employed in the present invention will be covered in the following section.

However, in carrying out the present invention and as far as the gauge pin switches are concerned, the absence of any ears in the welding station causes the pins to overtravel, thereby opening the normally closed switches 458 and preventing a circuit from being completed to the weld controller. In short, when no ear drop takes place to a misoriented pail, the weld controller is effectively disabled so that no weld occurs.

In accordance with one of the objectives of the invention, means are provided for counting successive pails found to lack ears in the checking station 65 and for shutting down the machine, or for notifying the machine operator, when the number of such successive pails reaches a predetermined total. It will be understood from the above that the lack of ears on a pail in the checking station will most commonly be due to the fact that such pail was not properly oriented thereby disabling ear drop reload solenoid 314a. Thus, it is presumed that when a group of successive pails are found to be without ears, the machine should be shut down until appropriate adjustment may be made in the final orienting station. To accomplish automatic shutdown there is provided in the present device an ear test relay 585 having normally open contacts 586 and normally closed contacts 587. The relay 585 is connected in series with section 537 of the cam switch and the ear test switches 480 in the ear checking station at opposite sides of the machine. The contacts 586, 587 are used to control a counter 590 having a count line 591 and reset line 592. Connected in series with the reset line is section 538 of the cam switch.

The ear checking switches 480 are normally closed. Thus, in the event that a pail in the checking station lacks ears, switches 480 will remain closed with the result that cycling of the cam switch section 537 applies an impulse to the relay 585, picking up the relay to cause closure of the normally open contacts 586 to register a count in the counting circuit. To store the count, i.e., to prevent resetting of a counter upon deenergization of the relay 585, a latching relay 595 is employed having a latch 596 which engages a cooperating latch member 597 on the plunger of the relay 585. Thus, the relay 585 is, temporarily, prevented from dropping out to the point of closing the contact 587.

If the next pail to enter the checking station 65 is also without ears, the above operation will be repeated, i.e., the relay 585 will be energized to close the contacts 586, so that a second count is registered in the counter. The counter may be a commercially available design so that upon reaching a set count, output contacts are operated. The output contacts, in the present instance indicated at 598, are in the form of normally closed contacts connected in series with the control circuit for the main motor 90. Thus, when the desired count of noneared pails is reached, which may be five in a practical case, the main driving motor is shut off, bringing the machine to a halt and clearly signifying to the operator that an adjustment should be made before operation is continued.

However, when an eared pail is detected prior to the set count, resetting is effected by section 539 of the cam switch. Since the latter is in series with the latch relay 595, the latch 596 is withdrawn and contacts 587 are closed to apply a reset signal to the line 592 which feeds the counter.

In order to prevent the latching relay from producing unwanted reset, the "on" time of the cam section 539 is made very short and is adjusted to fall within the "on" time of the cam section 537. Thus, when a pail without ears is in the checking station, resulting in energization of the relay 585, the latching relay 595 will be momentarily energized during the time interval that the relay 585 is picked up. Because of the shortness of the time of energization of the latching relay, the latch will fall back into latching position before the relay 585 becomes deenergized. Briefly stated, while it is true that the latching relay 595 is operated once each cycle, it is effective to unlatch the relay 585, i.e., to permit it to drop out, only when there is an eared pail in the checking station, since it is only then that the switches 480 are opened.

While the construction and operation of the counter 590 will be apparent to one skilled in the art from the foregoing description, it will be understood that we prefer to employ a counter of type HZ 150 A601 manufactured by Eagle Signal Co. and described in their Bulletin 725.

Figure 21A:
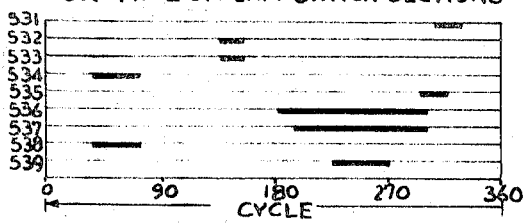

For the details of the program of the cam switch, reference is made to FIG. 21a which shows the "on" time for the switch sections 531—539 employed in the case of a practical installation.

FORCE-CURRENT CYCLE OF PROJECTION WELDING THROUGH PROTECTIVE COATING

While the discussion has been directed toward both the structural aspects of the welding machine and an improved method of checking the resultant products, it is one of the important features of the exemplary apparatus and welding system to provide a specific relationship between the structure and the specific force-current cycle which has been found to enable perfectly reliable welding through paint, lithographing, or other protective coating on the surface of the pail. As stated above, it is contemplated that the painting or lithographing will take place while the pail is still in the flat condition, with the surface being thoroughly covered so that no "bare spots" are available for making electrical contact.

We preferably employ a projection which is the result of a piercing operation so as to produce a tapered relatively sharp edge of limited cross section. A sectional view, taken through the projection and associated base member (the wall of the pail) is set forth in FIG. 23a, the scale being greatly enlarged to facilitate understanding. Thus, the projection indicated at 600, has a relatively sharp edge 601. In a practical case, such edge will not be smooth and continuous but on the contrary will be ragged or sawtoothed to define a number of projecting points arranged in a circular locus. In the same FIG. the base member has been indicated at 605 and the coating thereon by the layer 606. The projection has a height from the surface of the attachment indicated at $h1$. The welding electrodes 369, 371 previously discussed, and which are indicated by the dimension line in the FIG. preferably occupy an area which is substantially greater than the diameter of the projection, the major diameter of the projection being indicated at $d1$ and the minor diameter at $d2$.

In order to better understand the reasons for the effectiveness of the present apparatus and procedure in securing a sound weld through an insulating coating a series of stop motion cross section views have been prepared as set forth in FIGS. 23a—23b inclusive and which are keyed to a plot of projection height, pressure and current in a typical welding cycle. The FIGS. are based upon actual observations made in an effort to explain successive occurrences during the cycle.

FIG. 23a shows the initial condition with the electrodes brought into light contact with the work but with the substantially zero force applied and with the coating not yet penetrated. Upon slight additional movement of the movable electrode, the force applied rises rapidly as indicated at $F1$.

Since the spring is preferably stiff having a prestress force of approximately 330 pounds, concentrated upon a projection diameter $d2$ of only 0.040 inch, the sharp edge of the projection is forced through the coating to establish a limited area of electrical contact followed immediately by deformation or partial axial collapse of the projection to the condition shown in FIG. 23$b$ and with the projection height being reduced to a value $h2$. That is, the sharp edge 601 is crushed and tends to spread out in both radial directions, defining a reduced inner diameter $d3$ and an increased outer diameter $d4$. The net effect is to substantially increase the cross-sectional area of the metal at the edge of the projection. The initial electrical contact made between the parts, for example, as indicated at 607, is maintained during the transition and, in the following steps, the areas of electrical contact may even be enlarged depending upon the nature of the coating material. It may be emphasized at this point that advancement of the electrode 369 and the buildup of force along the applied force curve takes place positively substantially free of the effect of inertia or other transient effects which characterize air actuators or the like commonly employed in welding practice. Thus, the transition between conditions of contact shown in the stop motion views is progressive from the time that the initial electrical contact is made to the time that the projection is substantially flattened and free of any momentary release or rebound which might affect the continuity of the electrical circuit.

As the spring 380 in the welding gun 351 is picked up, in other words, as the central rod 358 is unseated from the seat 382 in the gun, the force exerted by the electrode 369 further increases, reaching a value F2 (FIG. 22) accompanied by further deformation of the projection, with the height being reduced to the value $h3$, the inner diameter being reduced to the value $d5$ and the outer diameter being increased to the value $d6$. The contact areas 607 remain in engagement and some of the coating material is trapped as indicated at 608.

At the end of the forward stroke of the gun actuating bar 398 (FIG. 14), the throw of which is determined by the cams which drive it, the are remains temporarily stationary to apply a high sustained force to the welding electrode having a value indicated at F3 in FIG. 22. Increase in force to the maximum value further deforms the projection until it appears as set forth in FIG. 23$d$. Here it will be noted that the inner diameter of the projection has been reduced to the point where the projection is substantially closed. The contact is maintained and enlarged over areas 607 and pockets of coating material 608 become more well defined.

Application of full welding current is delayed until after the projection has been substantially deformed, that is, substantially flattened out as indicated in FIG. 23$c$ or FIG. 23$d$. Thus the current is preferably turned on at point $c1$, i.e., after delay time $t1$ from the start of the welding cycle which may be in the order of one-twentieth second. This timing is achieved in the present instance, by the phase of section 536 of the cam switch which is in series with the input to the welding controller. However, as the discussion proceeds it will be apparent to one skilled in the art that such delay need not be secured by a timed switch and that, if desired, the current may be initiated by a switch which is responsive to the buildup of the force applied by the electrode 369 and spring 380.

The current, when applied, is not applied at full welding value but means are provided within the welding controller 580 for causing the current to build up from a reduced value $c1$ or less linearly along a characteristic curve $c2$ to a final value $c3$. Such build up of current in a practical case may take place over an interval $t2$ on the order of one-tenth second in length. Welding controllers capable of such "upslope" with variable rise time are commercially available.

Current and force are both thereafter maintained at the values $c3$, F3, respectively, which may be in the order of 9,000 amperes and 350 pounds, over a further interval $t3$ which may be on the order of 0.25 second. The heating which takes place during this time interval produces a temperature which is sufficiently high so that the metal softens and flows under the applied pressure so that complete flattening of the projection takes place, with loss of identity and with the two pieces of metal being united over the area of a welding nugget 610 having an area which is substantially greater than the area of the original projection. During this portion of the cycle any entrained coating material is decomposed and is found not to affect the soundness of the weld.

It is found that by using the above procedure, flashing, i.e., the burning away of the projection, is completely eliminated and that each weld is sound and homogeneous notwithstanding the insulating paint or other coating. Observations show that the elimination of flashing is due in part to the deformation of the thin tapering edge of the projection from the thin initial cross section to substantially thicker cross section before the application of current without interrupting the continuity of the contact originally made and with substantial increase in the thermal coupling between the projection and the relatively massive pieces of metal lying on the opposite sides of the projection. Because of the increase in cross section and the close thermal coupling excess localized heat is promptly conducted away so that there is no possibility of temperature buildup in the projection to the level at which burning or flashing away may occur. Localized buildup of heat in the projection is also minimized by the fact that the electrodes, both movable and fixed, constitute an efficient heat sink.

The continuous maintenance of electrical contact from the moment of initial contact by the points of the projection is also believed to be a contributing factor. As stated, such contact is maintained by reason of the fact that the electrodes are advanced positively and progressively without being affected by inertia effects or rebound. Moreover, use of a pierced projection tends to produce a scraping action as the projection is deformed, with part of the edge scraping inwardly to reduce a minimum diameter of the projection and the remainder scraping outwardly to increase the maximum diameter. Where such a projection is used and where the parts are put through a pressure cycle without application of the welding current, it is found that the insulating coating tends to be substantially cleared from a small but rather well-defined annular area. This scraping action is, however, to be distinguished from the scraping which might occur due to bodily deformation of the ear being attached. In the present procedure deformation is limited to the projection itself.

After the welding current has been applied the additional time $t3$ the current is cut off as shown in FIG. 21 but force continues to be applied for an additional time interval $t4$ to permit the weld to cool and remain intact when the force on the welding electrodes is released.

It is particularly noteworthy that all of the above occurs within an extremely short period of time, on the order of one-half second and it is, indeed, one of the features of the present machine that in spite of the sequential action production rates are obtainable which are comparable to or even higher than where conventional bare metal welding techniques are employed.

While a pierced projection has been described as the preferred embodiment, it will be understood that other specific shapes of projections may be employed having a relatively sharp edge for penetrating a coating, where the edge is either continuous or localized in the form of a point and where deformation of the edge occurs to increase the cross section and hence the thermal coupling upon application of force and prior to the application of the full welding current.

It will also be understood that there has herein been described and illustrated a novel apparatus and method for checking both for the presence of an ear and the adequacy of the welded connection to withstand its intended usage wherein an impulse is created indicative of a defective condition by virtue of the fact that the switches 480 (FIG. 21) remain closed. However, it is also within the scope of the invention to make use of normally open switches which are closed only when a properly welded ear or similar attachment is detected, in which event the control signal indicative of a defective condition may be the absence of a preset potential or signal level, and it is in this broad context that the phrases "control signal," "output signal," or "signal" have been used herein and in the appended claims.

We claim:

1. In a machine for welding an ear having a welding surface and a central bail opening to a metal pail, the combination comprising a frame providing a plurality of welding stations, transfer and positioning means for indexing a series of pails from one station to the next, the first station having means for orienting a pail in a desired position about its axis and relative to the machine, means in a subsequent one of the stations for feeding an ear to a position contacting the wall of the pail and for welding the ear to the pail, means in a final one of the stations for checking the presence or absence of an ear, means associated with the orienting means for detecting misorientation, means for coupling the detecting means to the ear feeding means so that no ear is fed when the misoriented pail moves into the welding station, and means responsive to the checking means for notifying the operator of the machine when a predetermined number of pails without ears have passed through the machine.

2. In a system for welding one or more attachments to a base member, the method of checking to determine the presence of an attachment welded to the base member and/or the adequacy of the weld created comprising the steps of:
   a. establishing a path of movement for the base member and any attachment welded thereto;
   b. interposing a feeler member in said path of movement in obstructing relation to any attachment welded to the base member;
   c. biasing said feeler member by a predetermined force;
   d. coupling said feeler member to force responsive means adapted to create a control signal for indicating the absence of a properly welded attachment upon sensing a force less than the predetermined force; and,
   e. shifting the base member relative to the feeler member so as to cause the latter to engage any attachment welded to the base member and thus apply a force to the attachment, whereupon the presence of a properly welded attachment will cause the creation of a force sufficiently great to overcome the biasing force and thus preclude the creation of a control signal, whereas the absence of an attachment and the presence of a defectively welded attachment will be incapable of causing the creation of a force sufficient to overcome the biasing force.

3. The method as set forth in claim 2 further including the steps of:
   f. counting the control signals produced by said force responsive means; and,
   g. producing an output signal upon counting $n$ control signals (where $n$ is any preselected integer) indicative of the detection of $n$ base members devoid of a properly welded attachment.

4. The method as set forth in claim 3 further including the step of restoring the count accumulated during step F to zero upon detection of a base member having an attachment properly welded thereto so that said output signal produced during step G is produced only upon detection of $n$ consecutive defective base members.

5. The method as set forth in claim 3 further characterized in that the output signal produced during step G is used to interrupt the normal operation of the welding system.